United States Patent
Allinson et al.

(10) Patent No.: US 10,764,617 B2
(45) Date of Patent: Sep. 1, 2020

(54) TIME SHIFT BUFFER VIA FLASH MEMORY (71) Applicant: Comcast Cable Communications, LLC, Philadelphia, PA (US)

(72) Inventors: Stephen Allinson, Fairless Hills, PA (US); Benny Pruden, Brownstown, PA (US); Jeffrey Wannamaker, Ontario (CA); Derik Yarnell, Montrose, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 648 days.

(21) Appl. No.: 14/862,772

(22) Filed: Sep. 23, 2015

(65) Prior Publication Data
US 2017/0085923 A1 Mar. 23, 2017

(51) Int. Cl.
*H04N 21/238* (2011.01)
*H04N 21/2387* (2011.01)
*H04N 21/2187* (2011.01)
*H04N 21/218* (2011.01)

(52) U.S. Cl.
CPC ..... *H04N 21/2387* (2013.01); *H04N 21/2181* (2013.01); *H04N 21/2187* (2013.01)

(58) Field of Classification Search
None
See application file for complete search history.

(56) References Cited

U.S. PATENT DOCUMENTS

| 2008/0168108 | A1* | 7/2008 | Molaro | G06F 11/1435 |
| 2008/0229353 | A1* | 9/2008 | Morris | H04N 7/17318 725/32 |
| 2009/0193486 | A1* | 7/2009 | Patel | H04N 5/76 725/114 |
| 2012/0321278 | A1* | 12/2012 | Walker | H04N 21/274 386/238 |
| 2015/0181273 | A1* | 6/2015 | Shaool | H04H 60/15 725/31 |

* cited by examiner

*Primary Examiner* — Nicholas T Corbo
(74) *Attorney, Agent, or Firm* — BakerHostetler (57) ABSTRACT

Methods and systems for managing data and/or operations on data are disclosed. A method can comprise receiving content from a first storage medium for playback. The received content can comprise a stored first portion of a transport stream. At least a portion of the received content can be caused to playback. A playback position of the at least a portion of the received content can be determined relative to a live position of the transport stream. If the determined playback position of the at least a portion of the received content is outside a predetermined threshold proximity to the live position, a second portion of the transport stream can be stored to the first storage medium. If the determined playback position of the received content is within the predetermined threshold proximity to the live position, the second portion of the transport stream can be stored to a second storage medium.

20 Claims, 7 Drawing Sheets

TIME SHIFT BUFFER VIA FLASH MEMORY

BACKGROUND

Data such as content can be provided by multiple sources. Recipients of data may be able to control the playback of certain content using time shifting (e.g., trick play) features such as pause, rewind, and fast-forward, for example. For example, digital video recorder (DVR) devices can be configured to receive and store data such as content and to control the playback of the stored content using time shifting features.

SUMMARY

Devices that are not configured with traditional DVR capabilities may not have the ability to time shift content such as rewinding, fast-forwarding, or pausing live content. Such non-DVR devices can be retrofitted with secure digital (SD) flash memory or a storage medium connected via universal serial bus (USB) and can be configured to provide time shifting capabilities to live content (e.g., current transport stream, live broadcast, etc.). However, large data blocks (e.g., greater than 64 kB) of the content can cause write and read delays to/from the non-DVR storage medium near a live point of the content.

In an aspect, a method can comprise receiving content from a first storage medium for playback. The received content can comprise a stored first portion of a transport stream. At least a portion of the received content can be caused to playback, for example render via a display. A playback position of the at least a portion of the received content can be determined relative to a live position of the transport stream. If the determined playback position of the at least a portion of the received content is outside a predetermined threshold proximity to the live position, a second portion of the transport stream can be stored to the first storage medium. If the determined playback position of the received content is within the predetermined threshold proximity to the live position, the second portion of the transport stream can be stored to a second storage medium.

In another aspect, a method can comprise receiving content from a first storage medium for playback. The received content can comprise a stored first portion of a transport stream. At least a portion of the received content can be caused to playback, for example render via a display. A playback position of the at least a portion of the received content can be determined relative to a live position of the transport stream. If the determined playback position of the received content is within a predetermined threshold proximity to the live position, at least a first portion of the transport stream can be stored to a first partition of the storage medium and at least a second portion of the transport stream can be stored to a second partition of the storage medium.

In another aspect, a method can comprise receiving content from a first storage medium for playback. The received content can comprise a stored first portion of a transport stream. At least a portion of the received content can be caused to playback, for example render via a display. A playback position of the at least a portion of the received content can be determined relative to a live position of the transport stream. Responsive to a determination that the determined playback position of the received content is within a predetermined threshold proximity to the live position, at least a first portion of the transport stream can be stored to a first portion of a data block having a finite block size and at least a second portion of the transport stream can be stored to a second portion of the data block, wherein the second portion of the data block is configured to be read prior to the first portion of the data block.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Non-DVR storage mediums such as SD flash memory can be used to provide a time shift buffer for caching a portion (e.g., a playback duration) of a current transport stream. As an example, the cached portion can be leveraged to provide trick play features during playback. As such, executing time shifting trick play features using a SD flash device can increase an amount of bandwidth per device. Instantaneous bandwidth variations due to bad block management, wear leveling, and other internal SD flash controller optimizations such as small block writes (e.g., 64 kB or less, 32 kB or less, customized size for storage medium), can impact dynamic random-access memory (DRAM) read/write buffer size. Using large block writes can improve bandwidth, decrease write amplification, and extend life of an SD flash device. However, large data blocks of the content can cause write and read delays to/from the SD flash device (e.g., non-DVR storage) near a live point of broadcast content. Such delays can negatively impact playback of content and can disrupt the user experience, in particular, for low bitrate content and low bitrate trick play index files (e.g., playlists, lists of media/content, etc.).

In an aspect, read/write delays can be managed by caching content in DRAM before it is written to the SD flash memory device when the playback position is approaching the live point of the content (e.g., 15 seconds behind live point). Such caching can allow the playback device to read the content from DRAM before it is written to the SD flash memory device, which would prevent a delay in playback to the user.

In another aspect, read/write delays can be managed by storing index data in a separate partition with smaller block size. Index data can comprise a list of media files, metadata, playlists such as an .M3U8 playlist, and the like. As an example, the SD flash memory can have a memory size of 550 kB with a partition of 16 kB configured to store index data. As a further example, the 16 kB can allow more efficient access to the stored index data than a 64 kB block, since the index data may not be read until it is written and the 64 kB may take longer to complete the write of the index data.

In a further aspect, read/write delays can be managed by writing index data along with video data in each 64 kB block. For example, index data can be written to a header or a pseudo header (e.g., the same, first 1 kB of data in the data block.) As such, the reading of the index data can be optimized as the recipient of the data block can access the header or pseudo header without having to read the entire 64 kB data bock.

Figure 1:
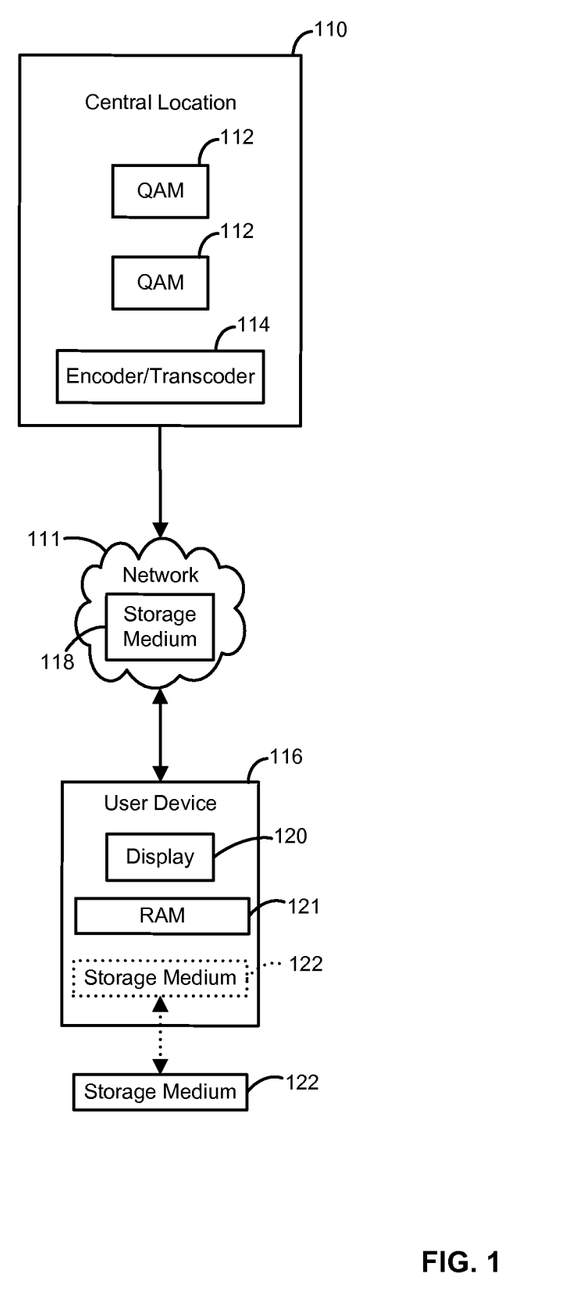
FIG. 1 is a block diagram of an example system and network.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The system and network can comprise a central location 110 (e.g., a headend, or processing facility), which can receive content (e.g., data, input programming) from multiple sources. The central location 110 can combine the content from the various sources and can distribute the content to user locations (e.g., device location) via a distribution system and/or network, such as network 111.

The central location 110 can be a data processing facility configured to receive content from a variety of sources. The content can be transmitted from the source to the central location 110 via a variety of transmission paths, including wireless and terrestrial paths. The central location 110 can comprise one or a plurality of signal modulators such as quadrature amplitude modulation (QAM) devices 112 that can be associated with an input source. The QAM devices 112 can convert received content into a modulated output signal suitable for transmission over the network 111. MPEG encoders, such as an encoder 114, can be included for encoding/transcoding data such as content. As an example, a data packaging device, such as a fragmentor, can be integrated with the encoder 114 (or separate and in communication with the encoder 114) to package the encoded/transcoded content. In an aspect, the encoder 114 and/or fragmentor can repeatedly embed markers, flags, and signals into the content data stream for processing by downstream devices.

The network 111 can be configured distribute signals from the central location 110 to user and/or device locations, such as a location of user device 116. The network 111 can be an optical fiber network, a broadband network, a coaxial cable network, a hybrid fiber-coaxial network, a wireless network, a satellite system, a direct broadcast system, or any combination thereof. There can be a multitude of user locations connected to network 111. In an aspect, the network 111 can comprise a storage medium 118. As an example, the storage medium 118 can be configured as network storage such as cloud storage accessible by one or more user devices 116. As a further example, a number of content assets (e.g., video, audio, etc.) can be loaded into the storage medium 118 and stored for playback or processing by the one or more user devices 116. However, other data, content, and/or information can be stored in the storage medium 118 such as advertisements and alternative content, for example. In an aspect, the storage medium 118 can be separate from the network 111. For example, the storage medium 118 can be located upstream of the user devices 116 and downstream of the network 111. As another example, the storage medium 122 can store information to be transmitted to any number of the user devices 116 or other recipient devices. As a further example, the user devices 116 can process a data stream, which can comprise audio, video, or other data from the network 111 with a regular cadence (e.g., every two seconds, four seconds, ten seconds, and the like). Other data and tracks can be received and processed by the user devices.

The user device 116 can be configured as a decoder, such as a gateway, set-top box, or communications terminal (CT) to decode, if needed, the signals for display on a display device, such as on a display 120. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, displays 120, central locations 110, DVR's, home theater PC's, and the like. As an example, the user device 116 can receive signals from the network 111 for rendering content via the user device 116. The user device can comprise random access memory (RAM) 121 (e.g., dynamic RAM (DRAM)) to allow at least a portion of the received signals (e.g., data) to be locally stored and retrieved from processing. As an example, rendering content can comprise providing audio and/or video, displaying images, facilitating an audio or visual feedback, tactile feedback, and the like. However, other content can be rendered via the user device 116. In an aspect, the user device 116 can be a CT, a set-top box, a television, a computer, a smartphone, a laptop, a tablet, a multimedia playback device, a portable electronic device, and the like configured to cause playback of content. As an example, the user device 116 can be an Internet Protocol compatible device for receiving signals via a network such as the Internet or some other communications network for providing content to the user. It is understood that other display devices and networks can be used. It is further understood that the user device 116 can be a widget or a virtual device for displaying content in a picture-in-picture environment such as via the display 120, for example.

The user device 116 can be configured to receive a removable storage medium 122. As an example, the removable storage medium 122 can comprise a flash memory. As a further example, a number of content assets (e.g., video, audio, etc.) can be written to the removable storage medium 122 and stored for playback or processing (e.g., tick play) by the associated user device 116. However, other data, content, and/or information can be stored in the removable storage medium 122 such as advertisements and alternative content, for example. In an aspect, the removable storage medium 122 can be separate from the user device 116 and in communication with the user device 116 such as via a portable flash drive. In an aspect, the removable storage medium 122 can be used to provide a time shift buffer for caching a portion (e.g., a playback duration) of a current transport stream received from the network 111. As an example, the cached portion can be leveraged to provide trick play features during playback.

Figure 2:
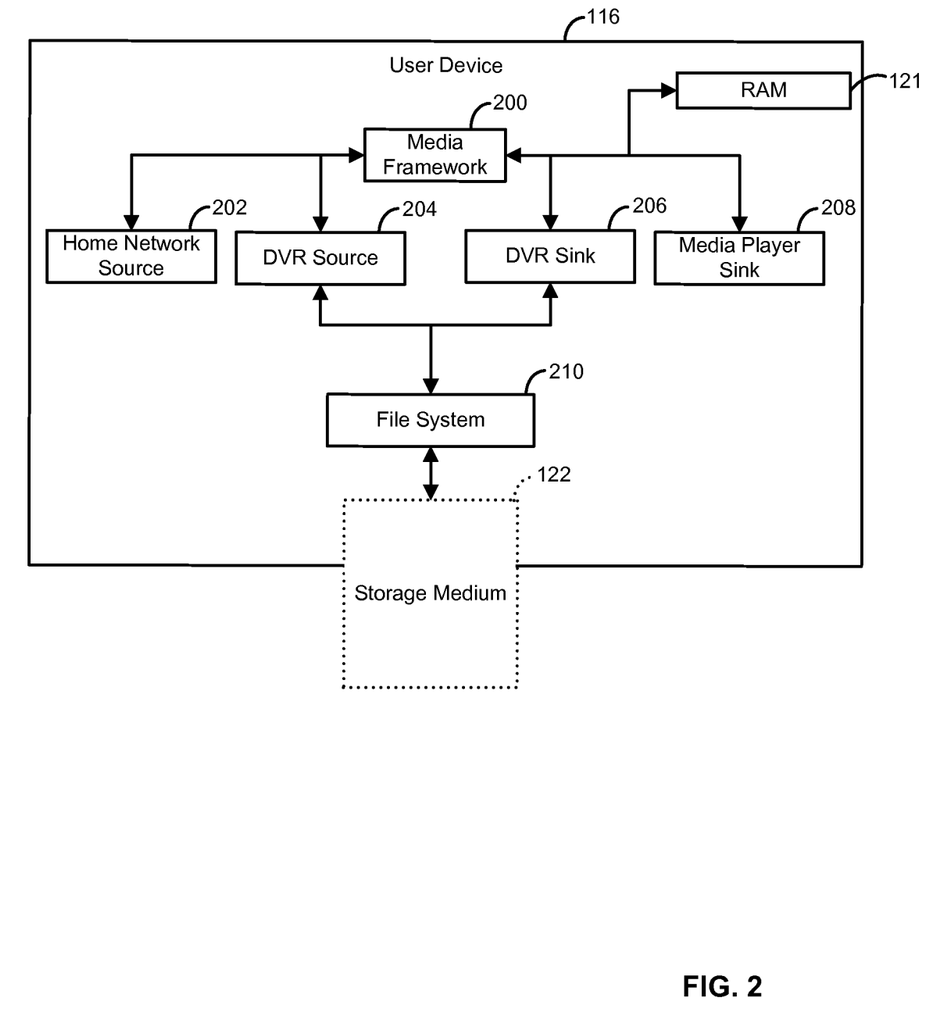
FIG. 2 is a block diagram of an example user device.

FIG. 2 illustrates an example of the user device 116. As shown, the user device 116 can comprise a media framework 200 for managing one or more media components (e.g., plug-ins) configured to control, for example, simple audio playback, audio and video playback, recording, streaming and editing. The media framework 200 can comprise hardware and/or software for managing the media components and service flows to/from the media components. In an aspect, the media components can comprise a media source 202, a DVR source 204, a DVR sink 206, and a media sink 208.

The media source 202 (e.g., home network source) can be or comprise software for receiving data, processing data, and outputting a content stream (e.g., single program transport stream (SPTS)). As an example, the media source 202 can be configured to decrypt content, for example, using digital transmission content protection (DTCP). As a further example, the media source 202 can be configured to communicate decrypted content to devices (e.g., the user device 116) on a user network or elsewhere.

The DVR source 204 can be or comprise software for receiving data, processing data, and outputting a content stream (e.g., single program transport stream). As an example, the DVR source 204 can be configured to manage the playback of stored content. As another example, the DVR source 204 can be configured to read content from storage and to output a content stream (e.g., MPEG SPTS) to recipient devices (e.g., the user device 116).

The DVR sink 206 can be or comprise software for managing the storing and indexing of data such as at least a portion of a content stream. As an example, the DVR sink 206 can be configured to store data to effect a time shift buffer and to enable trick play features. As a further example, the DVR sink 206 can be configured to store data as a persistent recording for subsequent retrieval and playback.

The media sink 208 can be or comprise software for managing the playback of data such as a live or recorded content stream. As an example, the media sink 208 can be configured to start/stop playback of content. As another example, media sink 208 can be configured to manage trick play features of the playback content.

The user device 116 can comprise a file system 210, such as a flash file system for interfacing with the removable storage medium 122. The file system 210 can be configured to manage the storage and retrieval of data to/from the removable storage medium 122. The file system 210 can comprise drivers to facilitate the management of various types and configurations of the removable storage medium 122. As an example, the file system 210 can manage the storage/retrieval of data to/from the removable storage medium 122 to provide a time shift buffer for caching a portion (e.g., a playback duration) of a current transport stream. As an example, the cached portion can be leveraged to provide trick play features during playback.

Figure 3A:
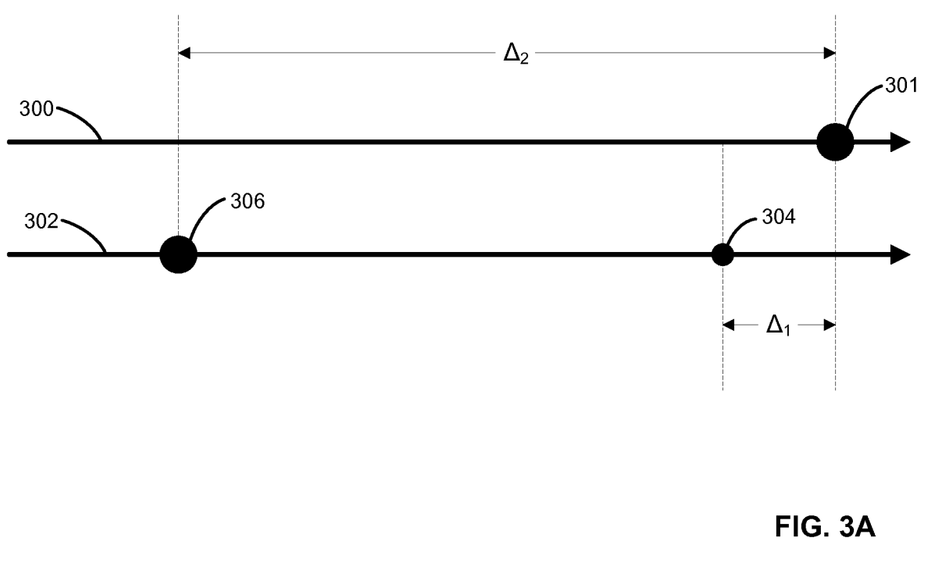
FIG. 3A is a representation of comparative data streams, showing a playback stream in a first position.
Figure 3B:
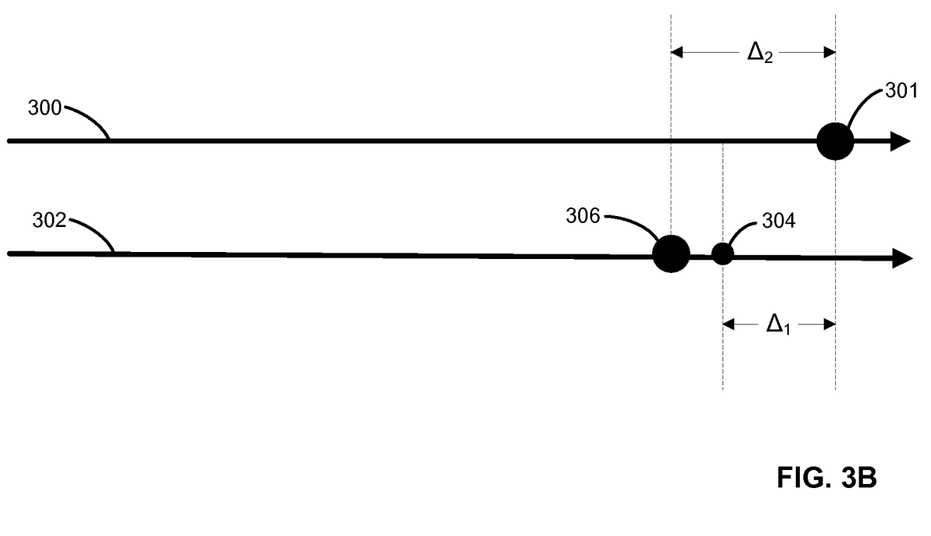
FIG. 3B is a representation of comparative data streams, showing a playback stream in a first position.

FIGS. 3A-3B illustrate representations of comparative data streams. As shown, a transport stream 300 is represented as a timeline with a current position 301 (e.g., live position) representing a position along the timeline where a user can be receiving live content along the transport stream 300. A stored stream 302 is represented as a parallel timeline with the transport stream 300, where a record position 304 represents a delayed recorded portion of the live position 301 of the transport stream 300. Such a delay, shift $\Delta_1$, can represent one or more of a temporal delay and a frame delay in the recording of the transport stream 300 from the actual live position 301 that is being recorded. The shift $\Delta_1$ can be caused by the latency in the processing required to record the portion of the transport stream 300. As shown, a user can request playback of the stored stream 302 at a playback position 306 that is shifted from the live position 301 by shift $\Delta_2$. Typically, as the playback position 306 advances along the stored stream 302, the stored stream is also expanding by recording additional content from the transport stream 300. However, the playback position 306 can be advanced toward a recorded live position (record position 304) and the actual live position 301, as shown in FIG. 3B. For example, when shift $\Delta_2$ is less than or equal to shift $\Delta_1$, large data blocks of the content (from the transport stream 300) can cause write and read delays to/from the stored stream 302. Such delays can negatively impact playback of content and can disrupt the user experience, in particular, for low bitrate content and low bitrate trick play index files (e.g., playlists, lists of media/content, etc.).

Figure 4:
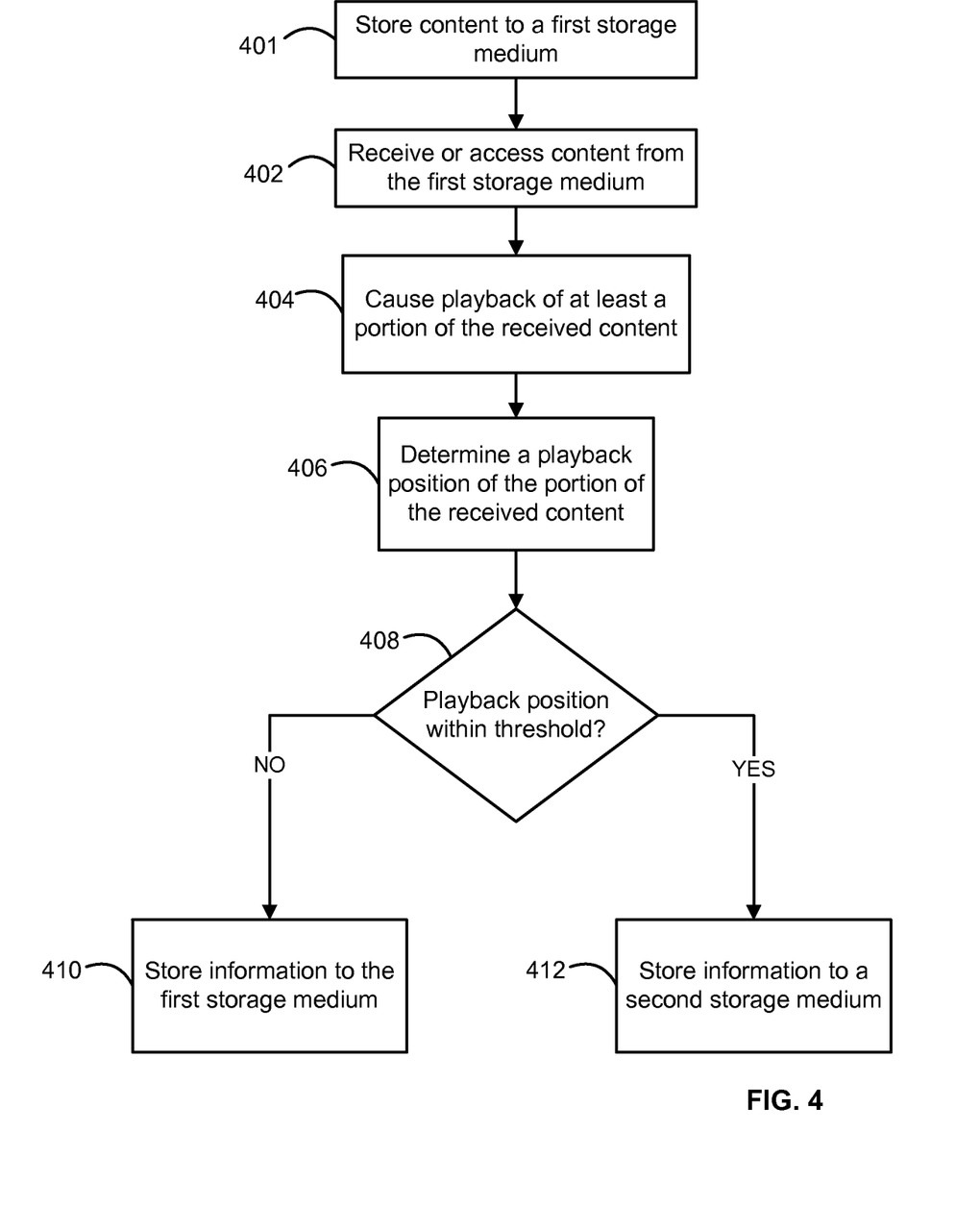
FIG. 4 is a flow chart of an example method.
Figure 5:
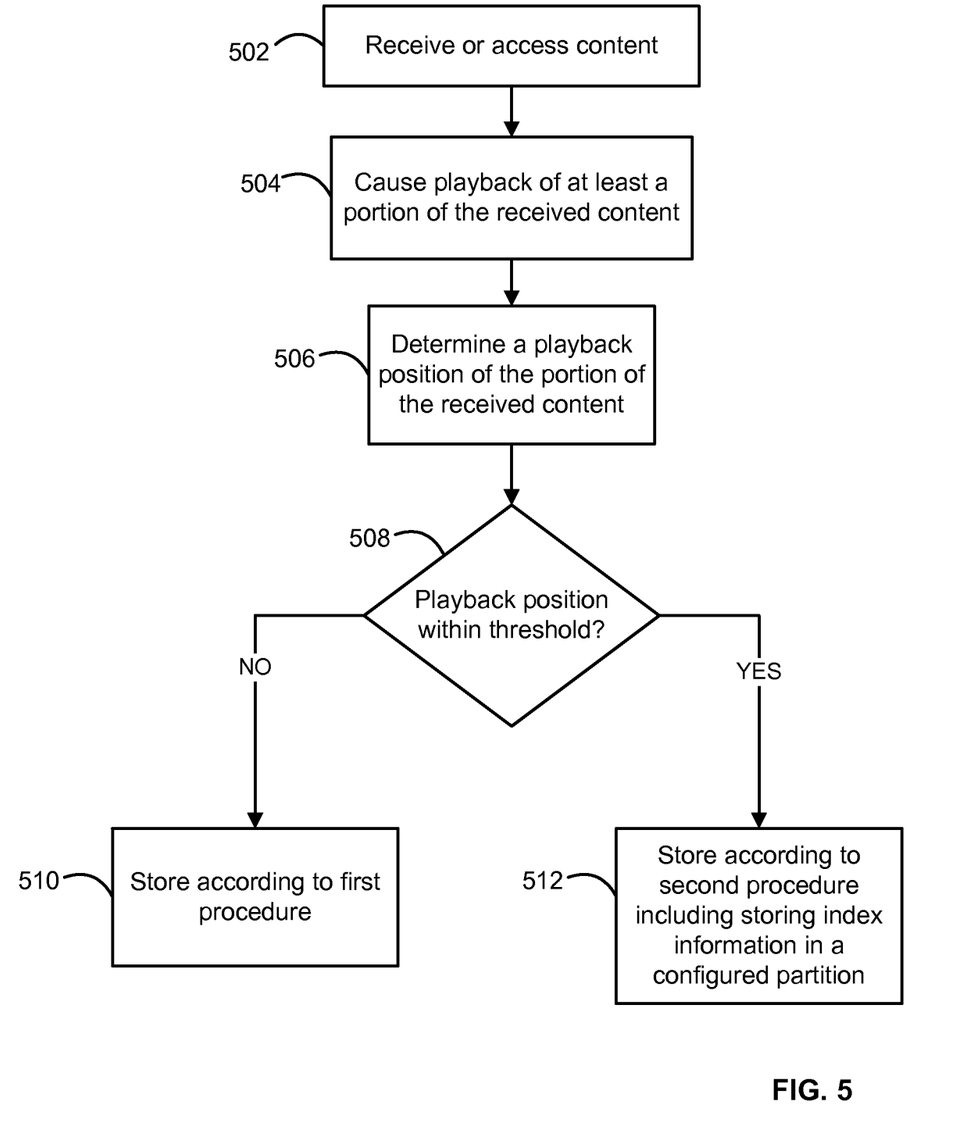
FIG. 5 is a flow chart of an example method.
Figure 6:
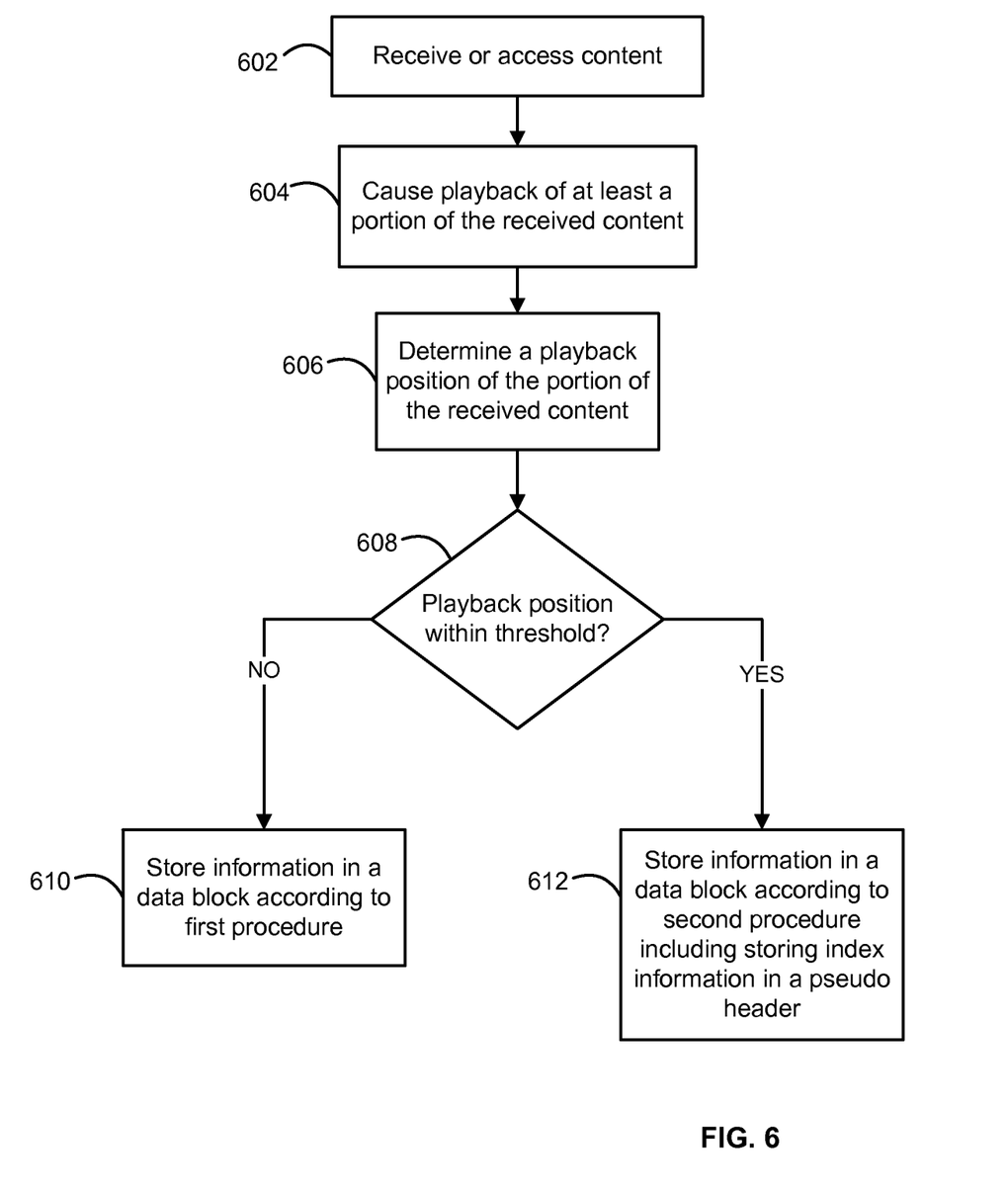
FIG. 6 is a flow chart of an example method.

FIGS. 4-6 illustrate operating procedures that can be used to mitigate the negative impacts of read/write delays in storing content. In an aspect, FIG. 4 depicts example operating procedures that may be implemented by the systems and networks described hereon. For example, read/write delays can be managed by caching content in DRAM before it is written to removable memory such as flash memory when the playback position is approaching the live point of the content (e.g., 15 seconds behind live point). Such caching can allow the playback device to read the content from DRAM before it is written to the removable memory, which would prevent a delay in playback to the user.

As an example, in operation 401, content such as a first portion of a transport stream (e.g., live single program stream, multi-program stream, transport stream 300 (FIG. 3)) can be stored to a first storage medium (e.g., storage medium 122 (FIG. 1)). For example, the first portion of the transport stream can be stored as a time shift buffer to facilitate trick play operations. As such, the store content can be accessed from the first storage medium for playback.

In operation 402, content can be received or accessed, for example, from the first storage medium (e.g., storage medium 122 (FIG. 1)) such as a removable memory, SD flash memory, or the like. The received content can comprise audio information, video information, index information, or a combination thereof. Accessing the stored content can comprise accessing index information and accessing one or more of audio and video information based upon the accessed index information. The index information can comprise a list of content assets (e.g., media files), metadata relating to the content assets, playlists, and the like.

In operation 404, playback of at least a portion of the received content can be caused to execute. As an example, the received content can be executed by a device such as the user device 102 (FIG. 1) to facilitate playback. As a further example, the playback of the at least the portion of the received content can comprise trick play features.

In operation 406, a playback position of the at least the portion of the received content can be determined relative to a live position of the transport stream (e.g., shift $\Delta_2$ (FIGS. 3A-3B)). The playback position can comprise one or more of an absolute time position, a relative time position, an absolute frame position, or a relative frame position, or a combination thereof.

In operation 408, it can be determined whether the playback position of the at least the portion of the received content is within a predetermined threshold, such as a threshold proximity to a live position of the transport stream (e.g., transport stream 300 (FIG. 3)). The determination can be made based upon a comparison of determined playback position to the predetermined threshold. Other mechanisms can be used such as mathematical and statistical methods to determine whether the playback position is within a threshold value.

In operation 410, information such as a second portion of the transport stream (e.g., transport stream 300 (FIG. 3)) can be stored to the first storage medium (e.g., storage medium 122 (FIG. 1)) if the determined playback position of the at least a portion of the received content is outside a predetermined threshold.

In operation 412, information such as the second portion of the transport stream (e.g., transport stream 300 (FIG. 3)) can be stored to a second storage medium (e.g., RAM 121 (FIG. 1), low latency memory, etc.) if the determined playback position of the at least a portion of the received content is within the predetermined threshold proximity to the live position. For example, referring to FIGS. 3A-3B, if shift $\Delta_2$ is less than or equal to shift $\Delta_1$, the second portion of the transport stream (e.g., transport stream 300) can be stored to a second storage medium. As such, the access to the second storage medium can have lower latency than the access to the first storage medium, thereby mitigating read/write delays.

FIG. 5 depicts example operating procedures that may be implemented by the systems and networks described hereon. In an aspect, read/write delays can be managed by storing index data in a partition of a storage medium that is separate from the indexed content data. For example, in operation 502, content can be received or accessed, for example, from a transport stream (e.g., transport stream 300 (FIG. 3)). The content can comprise audio information, video information, index information, or a combination thereof. Accessing the content can comprise accessing index information and accessing one or more of audio and video information based upon the accessed index information. The index information can comprise a list of content assets (e.g., media files), metadata relating to the content assets, playlists, and the like.

In operation 504, playback of at least a portion of the received content can be caused to execute. As an example, the received content can be executed by a device such as the user device 102 (FIG. 1) to facilitate playback. As a further example, the playback of the at least the portion of the received content can comprise trick play features that can time shift the playback position of the content from a live position of the underlying transport stream. Such trick play features can be facilitated via a time shift buffer such as caching portions of the transport stream to a first storage medium (e.g., storage medium 122 (FIG. 1)). As such, in operation 506, a playback position of the at least the portion of the received content can be determined relative to a live position of the transport stream (e.g., shift $\Delta_2$ (FIGS. 3A-3B)). The playback position can comprise one or more of an absolute time position, a relative time position, an absolute frame position, or a relative frame position, or a combination thereof.

In operation 508, it can be determined whether the playback position of the at least the portion of the received content is within a predetermined threshold, such as a threshold proximity to a live position of the transport stream (e.g., transport stream 300 (FIG. 3)). The determination can be made based upon a comparison of determined playback position to the predetermined threshold. Other mechanisms can be used such as mathematical and statistical methods to determine whether the playback position is within a threshold value.

In operation 510, a portion of the transport stream (e.g., transport stream 300 (FIG. 3)) can be stored according to a first procedure if the determined playback position of the received content is outside a predetermined threshold proximity to the live position. For example, the portion of the transport stream can be stored to any partition of the first storage medium (e.g., storage medium 122 (FIG. 1)). As a further example, variable data block sizes can be used for storage in the first procedure.

In operation 512, a portion of the transport stream (e.g., transport stream 300 (FIG. 3)) can be stored according to a second procedure. In an aspect, at least a first portion of the transport stream can be stored to a first partition of the first storage medium and at least a second portion of the transport stream to a second partition of the first storage medium if the determined playback position of the received content is within a predetermined threshold proximity to the live position. As an example, the at least the second portion of the transport stream can be stored to the second partition of the first storage medium in smaller data block sizes compared to the data block sizes of the first portion of the transport stream stored in the first partition of the first storage medium. In certain aspects, the first storage medium can comprise SD flash memory having a memory size of 550 kB with a partition of 16 kB configured to store index data (e.g., first portion). As a further example, the 16 kB partition can allow more efficient access to the stored index data than a 64 kB block, since the index data may not be read until it is written and the 64 kB may take longer to complete the write of the index data. Leveraging the storage or index data to a particular portion can minimize delay in reading the index data from the first storage medium.

FIG. 6 depicts example operating procedures that may be implemented by the systems and networks described hereon. In an aspect, read/write delays can be managed by writing index data in a sequential manner along with video data in each 64 kB block.

As an illustrative example, in operation 602, content can be received or accessed, for example, from a transport stream (e.g., transport stream 300 (FIG. 3)). The content can comprise audio information, video information, index information, or a combination thereof. Accessing the content can comprise accessing index information and accessing one or more of audio and video information based upon the accessed index information. The index information can comprise a list of content assets (e.g., media files), metadata relating to the content assets, playlists, and the like.

In operation 604, playback of at least a portion of the received content can be caused to execute. As an example, the received content can be executed by a device such as the user device 102 (FIG. 1) to facilitate playback. As a further example, the playback of the at least the portion of the received content can comprise trick play features that can time shift the playback position of the content from a live position of the underlying transport stream. Such trick play features can be facilitated via a time shift buffer such as caching portions of the transport stream to a first storage medium (e.g., storage medium 122 (FIG. 1)). As such, in operation 606, a playback position of the at least the portion of the received content can be determined relative to a live position of the transport stream (e.g., shift $\Delta_2$ (FIGS. 3A-3B)). The playback position can comprise one or more of an absolute time position, a relative time position, an absolute frame position, or a relative frame position, or a combination thereof.

In operation 608, it can be determined whether the playback position of the at least the portion of the received content is within a predetermined threshold, such as a threshold proximity to a live position of the transport stream (e.g., transport stream 300 (FIG. 3)). The determination can be made based upon a comparison of determined playback position to the predetermined threshold. Other mechanisms can be used such as mathematical and statistical methods to determine whether the playback position is within a threshold value.

In operation 610, information such as a portion of the transport stream (e.g., transport stream 300 (FIG. 3)) can be stored according to a first procedure. In an aspect, the first procedure can be executed if the determined playback position of the received content is outside a predetermined threshold proximity to the live position. As an example, in the first procedure, the portion of the transport stream can be stored to any portion of the first storage medium (e.g., storage medium 122 (FIG. 1)). As another example, variable data block sizes can be used for storage in the first procedure. As a further example, index information and content payload such as video and audio data can be stored in any manner and in any sequence in the first procedure.

In operation 612, information such as a portion of the transport stream (e.g., transport stream 300 (FIG. 3)) can be stored according to a second procedure. In an aspect, in the second procedure, at least a first portion of the transport stream can be stored to a first portion of a data block and at least a second portion of the transport stream can be stored to a second portion of the data block. The data block can have a pre-determined, finite storage size such as 64 kB and/or, for example, based upon the underlying storage medium. As an example, the second procedure can be executed in response to a determination that the determined playback position of the received content is within a predetermined threshold proximity to the live position. However, the second procedure can be implemented at other times and in response to other events such as events effecting read and writes of index information.

In certain aspects, the second portion of the data block can be configured to be read prior to the first portion of the data block. As an example, content payload (e.g., video and audio information) can be written to the storage medium as part of a predetermined, finite block size (e.g., 64 kB). As another example, index data relating to the content payload can be written to a header or a pseudo header (e.g., the first sequential 1 kB of data in the data block) as a second portion of the data block. As such, the reading of the index data can be read prior to the remaining data in the data block. Such index reading is therefore optimized, because the recipient of the data block can access the header or pseudo header without having to read the entire 64 kB data bock.

In at least some aspects, a server that implements a portion or all of one or more of the technologies described herein may include a general-purpose computer system that includes or is configured to access one or more computer-accessible media.

Figure 7:
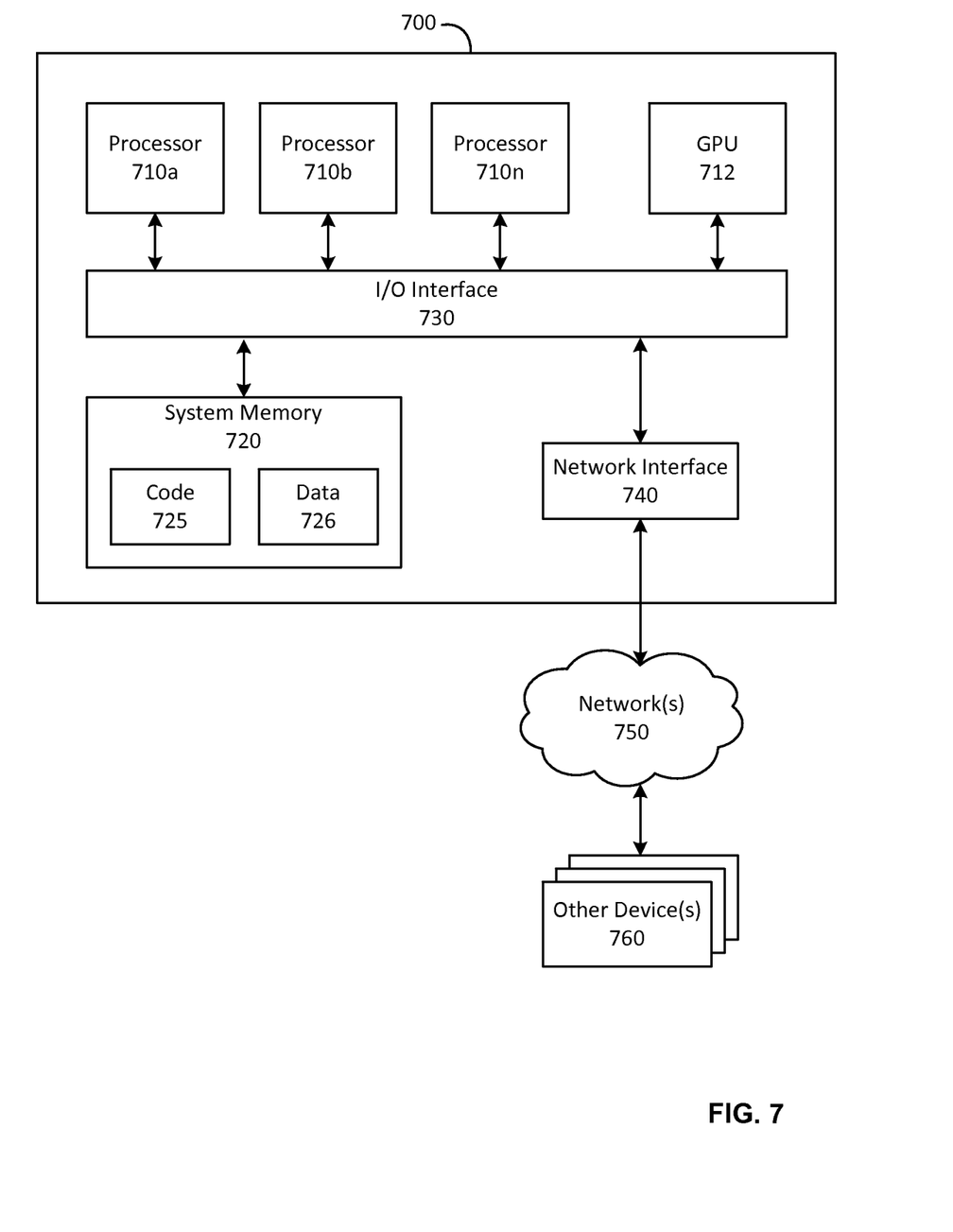
FIG. 7 is a block diagram of an exemplary computing system.

FIG. 7 depicts a general-purpose computer system that includes or is configured to access one or more computer-accessible media. In the illustrated aspect, a computing device 700 includes one or more processors 710a, 710b, and/or 710n (which may be referred herein singularly as a processor 710 or in the plural as the processors 710) coupled to a system memory 720 via an input/output (I/O) interface 730. The computing device 700 further includes a network interface 740 coupled to the I/O interface 730.

In various aspects, the computing device 700 may be a uniprocessor system including one of the processors 710 or a multiprocessor system including several of the processors 710 (e.g., two, four, eight, or another suitable number). The processors 710 may be any suitable processors capable of executing instructions. For example, in various aspects, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

In some aspects, a graphics processing unit ("GPU") 712 may participate in providing graphics rendering and/or physics processing capabilities. A GPU may, for example, comprise a highly parallelized processor architecture specialized for graphical computations. In some aspects, the processors 710 and the GPU 712 may be implemented as one or more of the same type of device.

The system memory 720 may be configured to store instructions and data accessible by the processor(s) 710. In various aspects, the system memory 720 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 720 as code 725 and data 726.

In one aspect, the I/O interface 730 may be configured to coordinate I/O traffic between the processor(s) 710, the system memory 720 and any peripherals in the device, including the network interface 740 or other peripheral interfaces. In some aspects, the I/O interface 730 may perform any necessary protocol, timing or other data transformations to convert data signals from one component (e.g., the system memory 720) into a format suitable for use by another component (e.g., one or more of the processors 710). In some aspects, the I/O interface 730 may include support for devices attached through various types of peripheral buses, such as a variant of the Peripheral Component Interconnect (PCI) bus standard or the Universal Serial Bus (USB) standard, for example. In some aspects, the function of the I/O interface 730 may be split into two or more separate components, such as a north bridge and a south bridge, for example. Also, in some aspects some or all of the functionality of the I/O interface 730, such as an interface to the system memory 720, may be incorporated directly into the processor 710.

The network interface 740 may be configured to allow data to be exchanged between the computing device 700 and other devices 760 attached to a network or networks 750, such as other computer systems or devices, for example. In various aspects, the network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 720 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to the computing device 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some aspects be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different aspects, including general-purpose or special-purpose computer servers, storage devices, network devices, and the like. In some aspects a client or user may be provided direct access to a resource instance, e.g., by giving a user an administrator login and password. In other aspects the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect or embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
    receiving, by one or more computing devices, content from a first storage medium for playback, wherein the received content comprises a stored first portion of a transport stream;
    causing, by the one or more computing devices, playback of at least a portion of the received content;
    determining, by the one or more computing devices, a playback position of the at least the portion of the received content relative to a live position of the transport stream;
    storing, by the one or more computing devices, a second portion of the transport stream to the first storage medium if the determined playback position of the at least a portion of the received content does not satisfy a threshold proximity to the live position; and
    storing, by the one or more computing devices, the second portion of the transport stream to a second storage medium if the determined playback position of the at least a portion of the received content satisfies the threshold proximity to the live position.

2. The method of claim 1, wherein the received content comprises one or more of audio information, video information, and index information.

3. The method of claim 1, wherein the transport stream comprises a single program transport stream.

4. The method of claim 1, wherein the receiving the content comprises accessing index information and accessing one or more of audio and video information based upon the accessed index information.

5. The method of claim 1, wherein the first storage medium comprises flash memory.

6. The method of claim 1, wherein the second storage medium comprises random access memory.

7. The method of claim 1, wherein the playback position comprises one or more of an absolute time position, a relative time position, an absolute frame position, or a relative frame position, or a combination thereof.

8. A method comprising:
    receiving, by one or more computing devices, content from a storage medium for playback, wherein the received content comprises a stored portion of a transport stream;
    causing, by the one or more computing devices, playback of the received content;
    determining, by the one or more computing devices, a playback position of the received content relative to a live position of the transport stream; and
    storing, by the one or more computing devices, at least a first portion of the transport stream to a first partition of the storage medium and at least a second portion of the transport stream to a second partition of the storage medium in response to a determination that the determined playback position of the received content satisfies a threshold proximity to the live position.

9. The method of claim 8, wherein the received content comprises audio information, video information, index information, or a combination thereof.

10. The method of claim 8, wherein the transport stream comprises a single program transport stream.

11. The method of claim 8, wherein the receiving the content comprises accessing index information and accessing one or more of audio and video information based upon the accessed index information.

12. The method of claim 8, wherein the first portion of the transport stream comprises one or more of video information and audio information and the second portion comprises index information.

13. The method of claim 8, wherein the at least the second portion of the transport stream is stored to the second partition of the storage medium in smaller data block sizes compared to the first portion of the transport stream stored in the first partition of the storage medium.

14. The method of claim 8, wherein the storage medium comprises flash memory.

15. The method of claim 8, wherein the playback position comprises one or more of an absolute time position, a relative time position, an absolute frame position, or a relative frame position, or a combination thereof.

16. A method comprising:
    receiving, by one or more computing devices, content from a storage medium for playback, wherein the received content comprises a stored portion of a transport stream;
    causing, by the one or more computing devices, playback of the received content;
    determining, by the one or more computing devices, a playback position of the received content relative to a live position of the transport stream; and
    responsive to a determination that the determined playback position of the received content satisfies a threshold proximity to the live position, storing, by the one or more computing devices, at least a first portion of the transport stream to a first portion of a data block having a finite block size and at least a second portion of the transport stream to a second portion of the data block, wherein the second portion of the data block is configured to be read prior to the first portion of the data block.

17. The method of claim 16, wherein the received content comprises audio information, video information, index information, or a combination thereof.

18. The method of claim 16, wherein the receiving the content comprises accessing index information and accessing one or more of audio and video information based upon the accessed index information.

19. The method of claim 16, wherein the first portion of the transport stream comprises one or more of video information and audio information and the second portion comprises index information.

20. The method of claim 16, wherein the storage medium comprises flash memory.

* * * * *